United States Patent Office 3,497,555
Patented Feb. 24, 1970

3,497,555
PROCESS OF MAKING ALIPHATIC AMINES
Zdzislaw J. Dudzinski, Clifton, N.J., assignor to Millmaster Onyx Corporation, New York, N.Y., a corporation of New York
No Drawing. Continuation-in-part of application Ser. No. 635,357, May 2, 1967. This application Mar. 25, 1969, Ser. No. 810,362
Int. Cl. C07c 85/04
U.S. Cl. 260—583          2 Claims

ABSTRACT OF THE DISCLOSURE

A process for making secondary or tertiary amines by reacting either a primary amine or a secondary amine with a monobrominated hydrocarbon having the bromine attached to the penultimate carbon atom and derived from a hydrobrominated alpha olefin, the reaction being effected in a solventless environment at a temperature of about 110° to 160° C. and a pressure of about atmospheric to 400 p.s.i.

---

This is a continuation-in-part of co-pending application Ser. No. 635,357, filed May 2, 1967, now issued as U.S. Patent No. 3,436,420.

This invention relates to an improved process for the preparation of aliphatic amines from monobrominated linear, saturated hydrocarbons having from 10 to 34 carbon atoms and having the bromine radical attached to the penultimate carbon atom, and it, particularly, relates to a process of this type wherein the amination is effected in a solventless environment.

It was heretofore believed that the preferable method for aminating monohalogenated hydrocarbons was to carry out the amination in a solvent such as water or a hydroxyl-bearing organic solvent. It was not believed possible to obtain sufficiently satisfactory results without such solvents. It then unexpectedly was discovered that if the reaction is effected, with monochlorinated hydrocarbons, at certain temperature and pressure conditions, without a solvent, not only were the results satisfactory, but that they were far superior to the results obtained when using a solvent. In this respect, not only was the yield significantly increased, but the process was greatly simplified because it obviated the necessity of using additional treating steps such as acidification, initial extraction, neutralization, and final extraction. The elimination of these steps not only expedited the process but also decreased the amount of labor and equipment and, therefore, substantially decreased the cost. The yield was even further increased when the solventless amination process was preceded by hydrochlorination of the alpha olefin by means of incremental conversion at relatively low temperatures.

It has now been discovered that the identical solventless process can be used with equally good results when monobrominated linear saturated hydrocarbons of the same chain length are substituted for the monochlorinated hydrocarbons.

The following examples are illustrative of the present invention, it being understood, however, that they are not intended to limit the invention. In this respect, it is to be noted that although the examples utilize certain secondary amines as a reactant, other secondary amines can be substituted in the identical process. Furthermore, the identical process can be used except for the substitution of a primary amine for the secondary amine, the only difference being that the use of the primary amine will result in a secondary amine.

EXAMPLE 1

About 1680 gms. of dodecene-1, containing about 6% by weight of branched chain olefin, plus about 350 mgms. of anhydrous ferric chloride, as a catalyst, were used in the reaction. About 10% by weight of this mixture was initially charged, at room temperature and pressure, into a flask equipped with a dropping funnel, a thermometer, a protected outlet and an absorber for excess HBr gas. Agitation was maintained throughout the reaction.

The HBr gas was bubbled through the charge for a period of 6 to 12 hours while maintaining the temperature at between about 50°–100° C., or until the reaction was essentially complete.

The product was then first washed with water and then with a 5% sodium carbonate solution, after which it was filtered and dried in vacuo at 50°–60° C.

Gas chromotography showed no 1-bromododecane. The product was obtained in 98% of the theoretical yield. The product was identified as 2-bromododecane.

Under the conditions of this example, the migration of the double bond to other than the alpha form was strictly minimized, both because of the considerably lower reaction temperature than used in prior processes and because of the gradual addition of the olefin to the reaction mass. The whole of the 1-dodecene may, of course, be charged at once.

Instead of 1-dodecene, other alpha olefins may be used in the same process. Such other olefins include 1-decene, 1-tetradecene, 1-hexadecene, 1-octadecene, 1-eicosene, etc. Also utilizable are 1-undecene, 1-tridecene, 1-pentadecene, 1-heptadecene, etc., such as may occur, for example, in the products of cracked wax.

For example, 1-tetradecene, when treated similarly to Example 1 yielded 95.5% of the theoretical. Other odd and even carbon homologs between $C_{10}$ and $C_{20}$ performed similarly.

A mixed alpha-olefin consisting of dodecene and tetradecene was similarly converted to the 2-bromoalkane.

EXAMPLE 2

One mol of each of the 2-bromoalkanes of Example 1 was reacted in a pressure vessel with five mols of dimethyl amine, in the absence of a solvent, for from 3 to 14 hours at temperatures ranging from 110° to 160° C. until reaction was complete. The pressures ranged up to about 400 p.s.i., depending on the temperature and the proportion of unreacted dimethylamine.

In general, the 2-bromoalkanes gave high yields of N,N-dimethylaminoalkane. In the case of 2-bromododecane, the yield was 88%.

It is to be noted that the dimethyl amine ratios may be varied between about 3 to 10 mols relative to 1 mol of bromide.

EXAMPLE 3

One mol of each of the 2-bromoalkanes of Example 1 ws reacted similarly for from 4 to 12 hours at temperatures from 130° to 200° C., with morpholine, at ratios of 2.5 to 7.0 mol of morpholine per mol of bromoalkane. The pressure varied with the temperature and the mol fraction of unreacted morpholine; e.g. about two atmospheres at 150° C. The 2-alkyl morpholines were obtained in excellent yield.

EXAMPLE 4

Bis(-2-hydroxethyl)-2-aminoalkanes were obtained by reacting, in an agitated flask, one mol of a 2-bromoalkane of Example 1 with five mols of the diethanolamine at about 160°–180° C. for eight hours.

In this manner, bis(2-hydroxyethyl)-2-aminododecane was obtained at 80% yield.

The 2-bromoalkanes could also be used with proportions of between 3 to 10 mols of diethanolamine, and the temperature may be varied between 140° and 200° C. over respective periods of betewen 14 to 6 hours.

EXAMPLE 5

One mol of 2-bromododecane and twelve mols of monomethylamine were reacted in the pressure vessel for eighteen hours at 120° to yield monomethyl-2-aminododecane in excellent yield. The homologous 2-bromoalkanes of Example 1 were prepared in a similar manner. Ratios of monomethylamine to bromoalkane ranged from 10 to 18 mols per mol, the temperature from 100–160° C., and the time from 20 to 10 hours.

The dodecyl derivative, for example, was obtained in 85% of the theoretical yield.

EXAMPLE 6

In the same manner as Example 4, monoethanolamine was reacted in an agitated flask with the homologous bromoalkanes at 120° C. for 18 hours, and at a ratio of amine to bromide of 12:1. 70% yield of N-mono-(2-hydroxyethyl)-2-aminododecane was obtained from the 2-bromododecane.

In the above examples, 2-iodoalkanes may be substituted for the 2-bromoalkanes.

The invention claimed is:

1. The method of making an aliphatic amine from a monobrominated aliphatic linear saturated hydrocarbon containing 10 to 34 carbon atoms and having the bromine radical attached to carbon atom number 2 which comprises reacting said monobrominated hydrocarbon with a base selected from the group consisting of an aliphatic primary amine and an aliphatic secondary amine, in the absence of a solvent, and at a temperature of between about 110° and 160° C. and a pressure of between about atmospheric and 400 p.s.i.

2. The method of claim 1 wherein the monobrominated hydrocarbon is a member of the group consisting of 2-bromodecane, 2-bromododecane, 2-bromotetradecane, 2-bromohexadecane, 2-bromooctadecane, 2-bromoeicosane, 2-bromoundecane, 2-bromotridecane, 2-bromopentadecane and 2-bromoheptadecane.

References Cited

UNITED STATES PATENTS

| 2,640,080 | 5/1953 | De Tar et al. | |
| 3,169,995 | 2/1965 | Roy et al. | |
| 3,287,411 | 11/1966 | Wakeman et al. | 260—583 |

CHARLES B. PARKER, Primary Examiner

RICHARD L. RAYMOND, Assistant Examiner

U.S. Cl. X.R.

260—585